(12) United States Patent
Hattori et al.

(10) Patent No.: US 9,620,288 B2
(45) Date of Patent: Apr. 11, 2017

(54) CHIP-COMPONENT STRUCTURE

(75) Inventors: Kazuo Hattori, Nagaokakyo (JP); Isamu Fujimoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 13/565,876

(22) Filed: Aug. 3, 2012

(65) Prior Publication Data

US 2013/0033836 A1    Feb. 7, 2013

(30) Foreign Application Priority Data

Aug. 5, 2011  (JP) ................ 2011-171435

(51) Int. Cl.
*H01G 4/30* (2006.01)
*H01G 2/06* (2006.01)
*H01G 4/232* (2006.01)

(52) U.S. Cl.
CPC ............ *H01G 4/30* (2013.01); *H01G 2/065* (2013.01); *H01G 4/232* (2013.01)

(58) Field of Classification Search
CPC ........... H01G 4/30; H01G 2/065; H01G 4/232
USPC ....................................................... 361/303
See application file for complete search history.

(56) References Cited

U.S. PATENT DOCUMENTS

| | | | |
|---|---|---|---|
| 6,816,356 B2* | 11/2004 | Devoe et al. ............ | 361/309 |
| 7,035,080 B1* | 4/2006 | Devoe et al. ............ | 361/306.1 |
| 2002/0089833 A1* | 7/2002 | Patel et al. ............ | 361/760 |
| 2004/0066589 A1* | 4/2004 | Togashi ............ | H01G 2/065 361/15 |
| 2005/0184381 A1* | 8/2005 | Asahi ............ | H01R 13/2414 257/693 |
| 2008/0112139 A1* | 5/2008 | Vinciarelli et al. ......... | 361/709 |
| 2008/0261350 A1* | 10/2008 | Daves et al. ............ | 438/106 |
| 2010/0123995 A1 | 5/2010 | Otsuka et al. | |

FOREIGN PATENT DOCUMENTS

| | | |
|---|---|---|
| CN | 1506988 A | 6/2004 |
| JP | 4-55123 U | 5/1992 |
| JP | 07-111380 A | 4/1995 |
| JP | 08-55752 A | 2/1996 |
| JP | 2003-158215 A | 5/2003 |
| JP | 2004-134430 A | 4/2004 |

(Continued)

OTHER PUBLICATIONS

Hattori et al., "Chip-Component Structure and Method of Producing Same," U.S. Appl. No. 13/569,454, filed Aug. 8, 2012.

(Continued)

*Primary Examiner* — Jenny L Wagner
*Assistant Examiner* — Michael P McFadden
(74) *Attorney, Agent, or Firm* — Keating & Bennett, LLP

(57) ABSTRACT

A chip-component structure includes an interposer and a multilayer capacitor mounted thereon. The interposer includes a substrate, a component connecting electrode, an external connection electrode, and a side electrode. The component connecting electrode and the external connection electrode are electrically connected by the side electrode. The component connecting electrode is joined to an external electrode of the multilayer capacitor. The substrate includes a communication hole that communicates between opposite spaces opening in both principal surfaces of the substrate.

16 Claims, 7 Drawing Sheets

(56) References Cited

FOREIGN PATENT DOCUMENTS

| JP | 2004-335657 A | 11/2004 |
|---|---|---|
| JP | 2007-005838 A | 1/2007 |
| JP | 2010-123614 A | 6/2010 |
| TW | 200409151 A | 6/2004 |

OTHER PUBLICATIONS

Official Communication issued in corresponding Chinese Patent Application No. 201210249474.0, mailed on Dec. 3, 2014.

* cited by examiner

CHIP-COMPONENT STRUCTURE

BACKGROUND OF THE INVENTION

1. Field of the Invention

The present invention relates to a chip-component structure including a multilayer capacitor and an interposer to be mounted on a circuit board including the capacitor disposed thereon.

2. Description of the Related Art

Currently, chip components, especially, small multilayer capacitors are frequently used in circuit boards of mobile terminals such as mobile telephones. A typical multilayer capacitor includes a laminated body shaped like a substantially rectangular parallelepiped in which internal electrodes are provided between a plurality of dielectric layers, and external electrodes provided on opposite longitudinal end surfaces of the laminated body.

In general, the multilayer capacitor is electrically and physically connected to a circuit board by placing the external electrodes on mounting lands of the circuit board and joining the mounting lands and the external electrodes with a joining material such as solder (for example, see Japanese Unexamined Patent Application Publication No. 8-55752).

In such a multilayer capacitor, small mechanical distortion is sometimes caused by voltage application. When the distortion is transmitted to the circuit board, audible sound is emitted from the circuit board. To address this problem, the capacitor is sometimes mounted on the circuit board with another member being disposed therebetween (for example, see Japanese Unexamined Patent Application Publication Nos. 2004-134430 and 2010-123614). As the member to be interposed between the capacitor and the circuit board, for example, an interposer or a conductive support member is used.

An interposer is a substrate including an upper electrode to which the external electrodes of the multilayer capacitor are joined, a lower electrode to be joined to the mounting lands of the circuit board, and side electrodes provided on end surfaces of the interposer to connect the upper electrode and the lower electrode.

A conductive support member includes support legs to be joined at lower ends to the mounting lands of the circuit board, and the support legs clamp and support the multilayer capacitor in the air.

To mount a multilayer capacitor on a circuit board with an interposer being disposed therebetween, for example, a chip-component structure is placed on flux and a joining material applied on mounting lands of the circuit board, and the joining material is solidified. After mounting, flux residues remain around the joining material. Flux residues corrode peripheral electrodes, and cause rust. For this reason, it is necessary to clean off the flux residues after mounting. However, if flux residues remain between a portion between the circuit board and a substrate of the interposer, they are difficult to clean off sufficiently.

SUMMARY OF THE INVENTION

Accordingly, preferred embodiments of the present invention provide a chip-component structure in which a portion between an interposer including a multilayer capacitor and a circuit board can be effectively cleaned after the interposer is mounted on the circuit board.

A preferred embodiment of the present invention relates to a chip-component structure in which a multilayer capacitor is provided on an interposer. The multilayer capacitor includes a laminated body and an external electrode. The laminated body preferably has a substantially rectangular parallelepiped shape and includes a plurality of dielectric layers and a plurality of internal electrodes stacked on each other. The external electrode is provided on a side surface of the laminated body, and is electrically connected to the internal electrodes. The interposer includes a substrate, a component connecting electrode, an external connection electrode, and a side electrode. The component connecting electrode is provided on a component mounting surface defining one principal surface of the substrate and is joined to the external electrode. The external connection electrode is provided on a mount surface defining the other principal surface of the substrate. The side electrode is provided on a side surface intersecting the component mounting surface and the mount surface of the substrate, and electrically connects the component connecting electrode and the external connection electrode. The substrate includes a communicating portion that communicates between a space on the mount surface and a space between the component mounting surface and the multilayer capacitor.

The communicating portion may be a hole that is open near a center of an area of the substrate facing the multilayer capacitor.

The communicating portion may be a groove provided on the side surface of the substrate to have a depth such as to reach an area facing the multilayer capacitor.

By virtue of these structures, air and cleaning agents flow through the communicating portion. This allows a flux residue to be more efficiently cleaned off from a gap between the circuit board and the substrate of the interposer.

In the chip-component structure, the side electrode may be provided at a position overlapping with the multilayer capacitor, as viewed in a principal-surface normal direction.

In the chip-component structure, the side surface of the substrate on which the side electrode is provided may be located on an outer side of the side surface of the laminated body that is parallel to the side surface of the substrate.

By virtue of these structures, it is possible to further reduce the amount of joining material that wets and spreads on the side electrode of the interposer to reach the external electrode of the multilayer capacitor, and to reduce audible noise in a circuit board.

According to the chip-component structure of various preferred embodiments of the present invention, cleaning liquid and air easily come out from the communicating portion. Hence, flux residues remaining in the gap between the interposer and the circuit board in a mounted state can be cleaned off effectively.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A chip-component structure 1 according to a first preferred embodiment of the present invention will be described below.

The chip-component structure 1 includes a multilayer capacitor 2 and an interposer 3. Details of the structures of the multilayer capacitor 2 and the interposer 3 will be described in detail below.

Figure 1A:
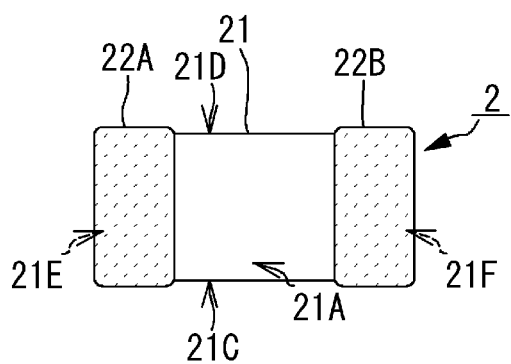
FIGS. 1A to 1C illustrate a structure of a multilayer capacitor according to a first preferred embodiment of the present invention.
Figure 1C:
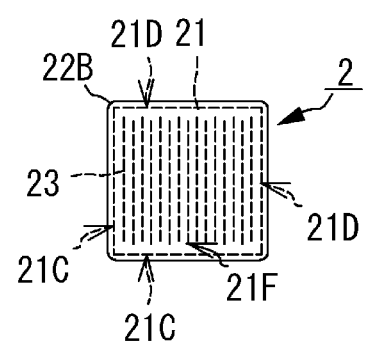
Figure 1B:
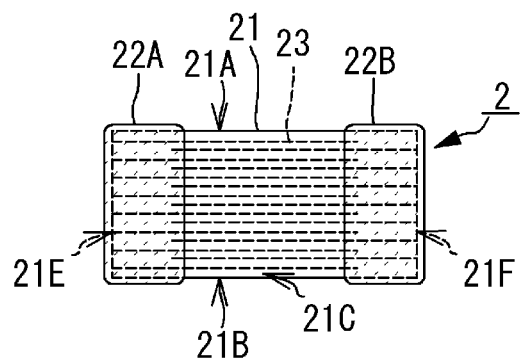
Figure 2A:
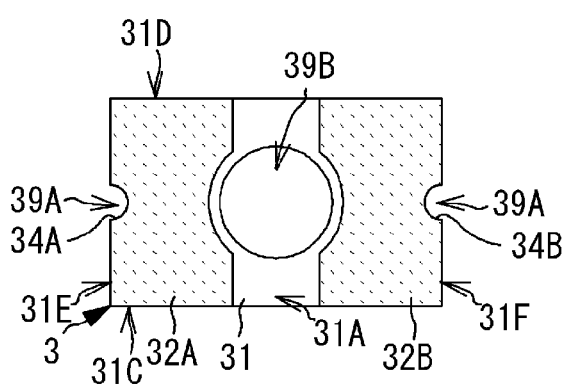
FIGS. 2A to 2F illustrate a structure of an interposer according to the first preferred embodiment of the present invention.
Figure 2C:
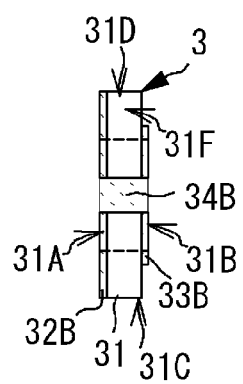
Figure 2E:
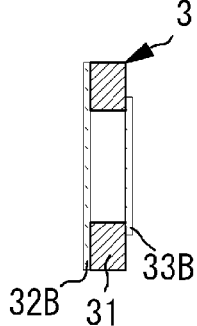
Figure 2B:
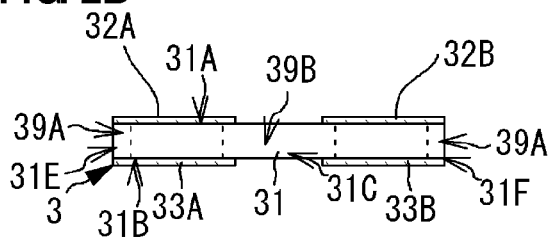
Figure 2D:
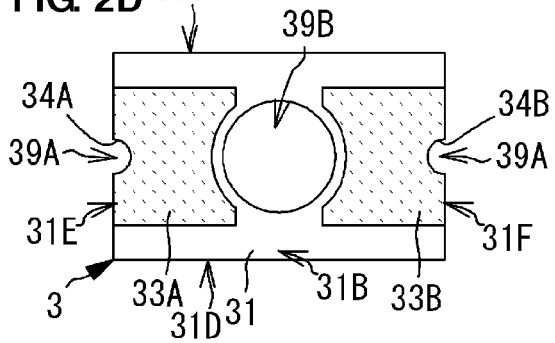
Figure 2F:
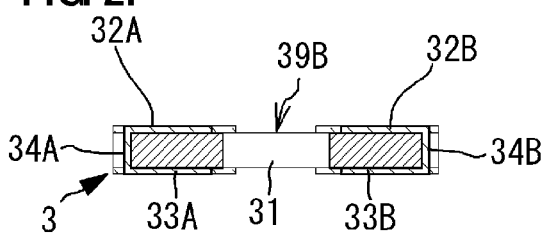
Figure 3A:
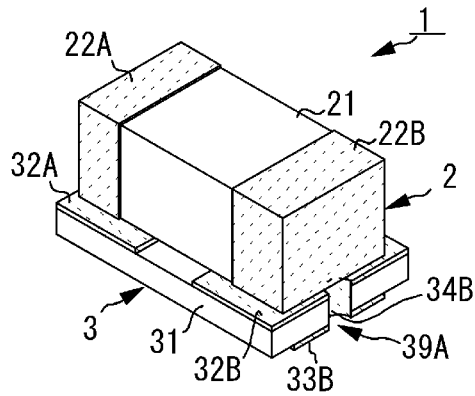
FIGS. 3A to 3F illustrate a structure of a chip-component structure according to the first preferred embodiment of the present invention.
Figure 3B:
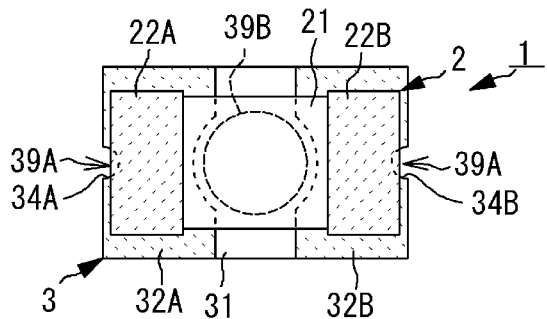
Figure 3D:
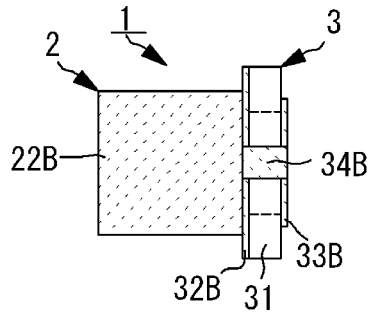
Figure 3C:
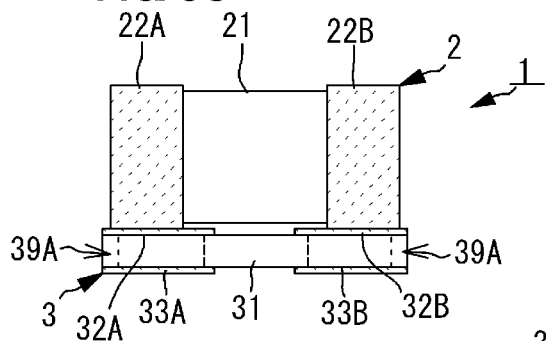
Figure 3F:
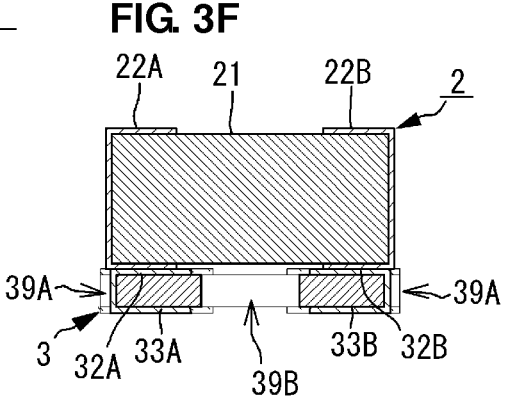
Figure 3E:
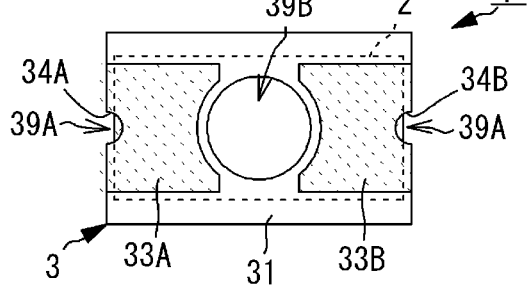

FIGS. 1A, 1B, and 1C are a plan view, a front view, and a right side view, respectively, of the multilayer capacitor 2.

The multilayer capacitor 2 includes a laminated body 21, external electrodes 22A and 22B, and internal electrodes 23.

The laminated body 21 preferably has a substantially rectangular parallelepiped outer shape including a top surface 21A, a bottom surface 21B, a front surface 21C, a back surface 21D, a left side surface 21E, and a right side surface 21F. The top surface 21A, the bottom surface 21B, the front surface 21C, and the back surface 21D are substantially rectangular, and are adjacent to one another at long sides. The left side surface 21E and the right side surface 21F are substantially square, and are adjacent to short sides of the front surface 21A, the bottom surface 21B, the front surface 21C, and the back surface 21D. The laminated body 21 is preferably formed by stacking a plurality of dielectric layers in a direction perpendicular or substantially perpendicular to the top surface 21A and the bottom surface 21B.

In the laminated body 21, the internal electrodes 23 are also stacked with the dielectric layers being disposed therebetween.

The external electrode 22A is provided on areas of the top surface 21A, the bottom surface 21B, the front surface 21C, and the back surface 21D of the laminated body 21 that extend for a constant distance from the left side surface 21E, and on the left side surface 21E. The external electrode 22B is provided on areas of the top surface 21A, the bottom surface 21B, the front surface 21C, and the back surface 21D of the laminated body 21 that extend for a constant distance from the right side surface 21F, and on the right side surface 21F.

The external electrodes 22A and 22B may be plated with a predetermined metal in consideration of corrosion resistance and conductivity. Preferably, the multilayer capacitor 2 has a popular outer size, for example, longitudinal and lateral dimensions of about 3.2 mm×1.6 mm, about 2.0 mm×1.25 mm, about 1.6 mm×0.8 mm, about 1.0 mm×0.5 mm, or about 0.6 mm×0.3 mm.

FIGS. 2A, 2B, 2C, 2D, 2E, and 2F are a plan view, a front view, a right side view, a bottom view, a sectional side view, and a sectional front view, respectively, of the interposer 3.

The interposer 3 includes a substrate 31, component connecting electrodes 32A and 32B, external connection electrodes 33A and 33B, and side electrodes 34A and 34B.

The substrate 31 is preferably formed of insulating resin, and has an outer shape like a substantially rectangular flat plate including a top surface 31A, a bottom surface 31B, a front surface 31C, a back surface 31D, a left side surface 31E, and a right side surface 31F. The top surface 31A defines a component mounting surface, and the bottom surface 31B defines a mount surface. The substrate 31 preferably has a thickness of, for example, about 0.5 mm to about 1 mm in a principal-surface normal direction (a normal direction to a principal surface) orthogonal or substantially orthogonal to the top surface 31A and the bottom surface 31B.

The substrate 31 includes grooves 39A and a communication hole 39B. The grooves 39A are provided in the left side surface 31E and the right side surface 31F. The grooves 39A preferably have a substantially semi-arc planar shape, as viewed in the principal-surface normal direction, and extend in the principal-surface normal direction from the center of the substrate 31 in a depth direction (a direction perpendicular to the front surface 31C and the back surface 31D). The communication hole 39B extends through the top surface 31A and the bottom surface 31B to be open in a substantially circular form near the centers of the top surface 31A and the bottom surface 31B.

The component connecting electrodes 32A and 32B are provided on the top surface 31A. The component connecting electrode 32A is provided in an area that extends for a constant distance from a boundary line between the top surface 31A and the left side surface 31E, except for a peripheral portion of the communication hole 39B. The width of the component connecting electrode 32A corresponds to the overall length of the boundary line. The component connecting electrode 32B is provided in an area that extends for a constant distance from a boundary line between the top surface 31A and the right side surface 31F, except for the peripheral portion of the communication hole 39B. The width of the component connecting electrode 32B corresponds to the overall length of the boundary line.

The component connecting electrodes 32A and 32B may have any shape as long as they are in contact with the boundary lines between the top surface 31A and the side surfaces 31E and 31F. For example, when the component connecting electrodes 32A and 32B have a planar shape that nearly coincides with the planar shape of the external electrodes 22A and 22B of the multilayer capacitor 2, the multilayer capacitor 2 can be mounted on a desired position with a high accuracy by a so-called self-alignment effect.

The external connection electrodes 33A and 33B are provided on the bottom surface 31B. The external connection electrode 33A is provided in an area that extends for a constant distance from a boundary line between the bottom surface 31B and the left side surface 31E, except for a peripheral portion of the communication hole 39B. The width of the external connection electrode 33A is smaller by fixed dimensions at both ends than the length of the boundary line. The external connection electrode 33B is provided in an area that extends for a constant distance from the boundary line, except for the peripheral portion of the communication hole 39B. The width of the external connection electrode 33B is smaller by fixed dimensions at both ends than the length of the boundary line.

The external connection electrodes 33A and 33B may have any shape as long as they are in contact with the boundary lines between the bottom surface 31B and the side surfaces 31E and 31F. For example, the shape of the external connection electrodes 33A and 33B can be set according to mounting lands on a circuit board on which the chip-component structure 1 is to be mounted.

The side electrodes 34A and 34B are provided on substantially arc-shaped side walls of the grooves 39A. The side electrode 34A provides electrical continuity between the component connecting electrode 32A and the external connection electrode 33A. The side electrode 34B provides electrical continuity between the component connecting electrode 32B and the external connection electrode 33B.

FIGS. 3A, 3B, 3C, 3D, 3E, and 3F are an external perspective view, a plan view, a front view, a right side surface, a bottom view, and a sectional front view, respectively, of the chip-component structure 1.

In the chip-component structure 1, the above-described multilayer capacitor 2 is mounted on the interposer 3. A surface of the multilayer capacitor 2 to be mounted on the interposer 3 may be any of the top surface 21A, the bottom surface 21B, the front surface 21C, and the back surface 21D described above. In the first preferred embodiment, the planar shape of the substrate 31 preferably is slightly larger than the planar shape of the multilayer capacitor 2 so that the grooves 39A of the interposer 3 overlap with the multilayer capacitor 2 near the bottom.

The multilayer capacitor 2 is mounted on the interposer 3 so that the external electrodes 22A and 22B overlap with the grooves 39A, and the external electrodes 22A and 22B are joined to the component connecting electrodes 32A and 32B, respectively. Thus, the external electrodes 22A and 22B of the multilayer capacitor 2 are respectively connected to the external connection electrodes 33A and 33B via the component connecting electrodes 32A and 32B and the side electrodes 34A and 34B of the interposer 3.

The external electrodes 22A and 22B and the component connecting electrodes 32A and 32B may be joined by any method. For example, the external electrodes 22A and 22B and the component connecting electrodes 32A and 32B can be joined by remelting a remeltable metal (e.g., tin) with which the electrodes are plated beforehand. By such a joining method, the component connecting electrodes 32A and 32B can be connected to the external electrodes 22A and 22B by the remelted plating metal. Other joining methods may be used, and for example, the multilayer capacitor 2 and the interposer 3 may be joined with a joining material such as solder.

Figure 4A:
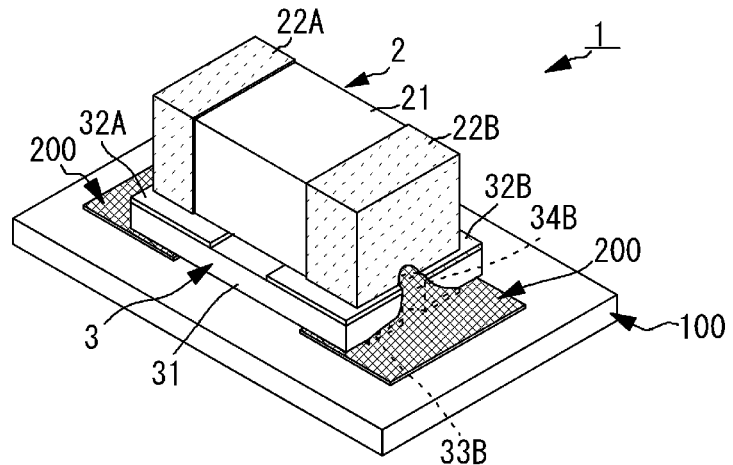
FIGS. 4A to 4C illustrate a mount state of the chip-component structure of the first preferred embodiment of the present invention.
Figure 4B:
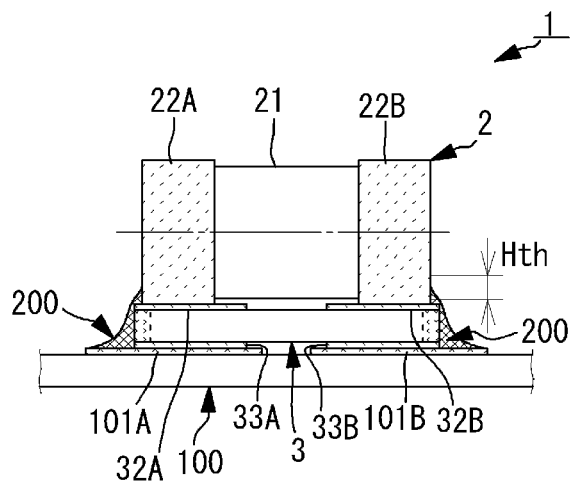
Figure 4C:
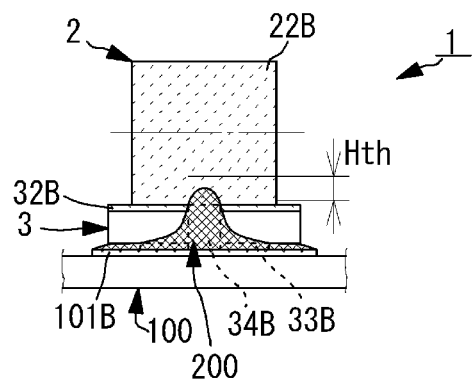

FIGS. 4A, 4B, and 4C are a perspective view, a front view, and a right side view, respectively, illustrating a state in which the chip-component structure 1 is mounted on a circuit board 100.

The chip-component structure 1 is mounted on the circuit board 100 using solder 200 as a joining material. The circuit board 100 includes mounting lands 101A and 101B on which solder paste and flux are applied. The chip-component structure 1 is mounted on the circuit board 100 by melting and solidifying the solder paste in a state in which the external connection electrodes 33A and 33B of the chip-component structure 1 are in contact with the mounting lands 101A and 101B. When the solder paste is melted and solidified, melted solder wets and spreads over the side electrodes 34A and 34B of the chip-component structure 1, thereby forming fillets.

The fillets of the solder 200 are formed at least from the mounting lands 101A and 101B to the side electrodes 34A and 34B. Therefore, the fillets can join the chip-component structure 1 and the circuit board 100 with a sufficient joint strength. Also, the fillets can prevent the chip-component structure 1 from coming off of the circuit board 100. Further, joint failure can be visually checked from the shape of the fillets. The joining material is not limited to the solder 200, and any joining material may be used as long as it has appropriate wettability and conductivity.

After the chip-component structure 1 having the above-described structure is mounted on the circuit board 100, flux residues sometimes remain around the solder 200. Since the flux residues corrode the peripheral electrodes and cause rust, they are cleaned off after mounting. In this structure, the communication hole 39B opens to spaces facing both principal surfaces of the interposer 3, that is, to a space between the interposer 3 and the multilayer capacitor 2 and a space between the interposer 3 and the circuit board 100, and allows air flow between the spaces. Hence, cleaning liquid and air easily come out through the communication hole 39B, and a portion between the interposer 3 and the circuit board 100 can be cleaned effectively. For increasing the cleaning effect, a diameter of the communication hole 39B is preferably equal or more than about one half of the dimension in the shortened direction.

In the chip-component structure 1, substrate end surfaces of the interposer 3 are separate from component end surfaces of the multilayer capacitor 2, the grooves 39A extend to the bottom side of the multilayer capacitor 2, and the side electrodes 34A and 34B are provided only on the side walls of the grooves 39A. Hence, the solder 200 does not easily wet and spread from the side electrodes 34A and 34B onto the upper surface of the interposer 3 across the bottom surface of the multilayer capacitor 2. Therefore, even if the amount of supplied solder paste is large to some extent, the solder 200 is unlikely to wet and spread onto the external electrodes 22A and 22B on both end surfaces of the multilayer capacitor 2, and this reduces the amount of solder 200 that reaches the external electrodes 22A and 22B. For example, when the amount of solder is similar to that adopted when the multilayer capacitor 2 is directly mounted on the mounting lands 101A and 101B, a height $H_{th}$ of solder 200 that wets and spreads on the external electrodes 22A and 22B can be limited to be small enough to suppress acoustic noise.

For this reason, the multilayer capacitor 2 is not directly mounted on the circuit board 100 with the solder 200, but is substantially indirectly mounted on the circuit board 100 with the interposer 3 being disposed therebetween. Thus, distortion of the multilayer capacitor 2 resulting from the application of voltage from the mounting lands 101A and 101B is not directly transmitted to the circuit board 100 via the solder 200. This greatly reduces audible sound produced from the circuit board 100.

While the planar shape of the substrate 31 preferably is slightly larger than the planar shape of the multilayer capacitor 2 in the first preferred embodiment, the size of the substrate 31 may be increased or decreased. For example, even if a dimension from the left side surface 31E to the right side surface 31F of the interposer 3 coincides with a dimension from the left side surface 21E to the right side surface 21F of the multilayer capacitor 2, as long as the grooves 39A extend to the bottom side of the multilayer capacitor 2, the amount of solder that wets and spreads to the side surfaces of the multilayer capacitor 2 across the bottom surface can be reduced.

Second Preferred Embodiment

Figure 5A:
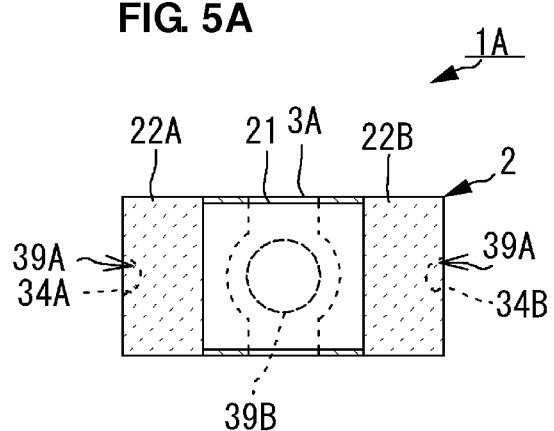
FIGS. 5A to 5C illustrate a structure of a chip-component structure according to a second preferred embodiment of the present invention.
Figure 5B:
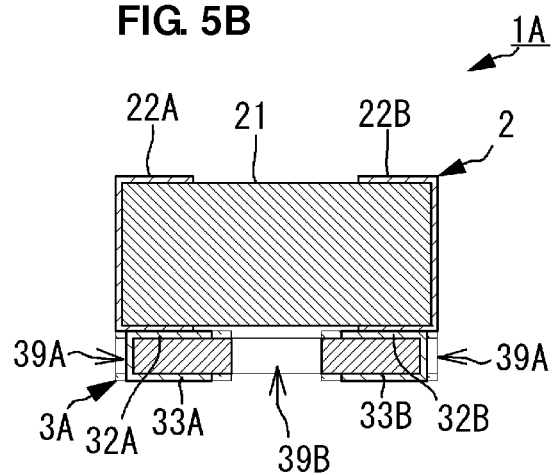
Figure 5C:
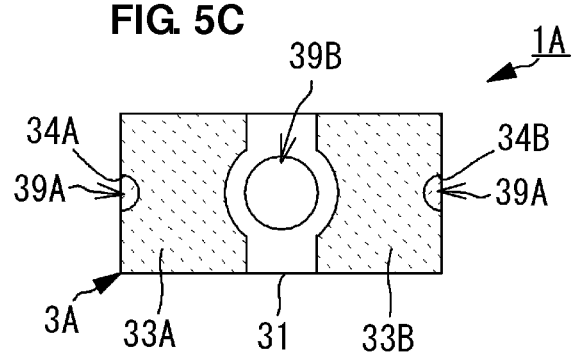

FIGS. 5A, 5B, and 5C are a plan view, a sectional front view, and a bottom view, respectively, of a chip-component structure 1A according to a second preferred embodiment.

The chip-component structure 1A of the second preferred embodiment is preferably the same in the structure of a multilayer capacitor 2 as the chip-component structure 1 of the first preferred embodiment, but is different in that an interposer 3A having a different size is included. For this reason, in the following description, structures corresponding to the structures adopted in the first preferred embodiment are denoted by the same reference numerals.

The outer shape of the interposer 3A in plan view is substantially identical to that of the multilayer capacitor 2. For this reason, arcs of grooves 39A provided in both longitudinal end surfaces of a substrate 31 are entirely located under bottom surfaces of external electrodes 22A and 22B of the multilayer capacitor 2.

In this structure, a communication hole 39B is open to spaces facing both principal surfaces of the interposer 3A, that is, to a space between the interposer 3A and the multilayer capacitor 2 and a space between the interposer 3A and a circuit board, and allows air flow between the spaces. Hence, cleaning liquid and air easily come out through the communication hole 39B, and a portion between the interposer 3A and the circuit board can be cleaned effectively.

Solder that wets and spreads on side electrodes 34A and 34B is prevented by the bottom surface of the multilayer capacitor 2 from further spreading onto an upper surface of the interposer 3A. This limits the amount of solder that reaches the external electrodes 22A and 22B, and reduces vibration noise.

Since the area of the interposer 3A is substantially equal to that of the multilayer capacitor 2 in plan view, even when the interposer 3A is used, the mounting area does not increase. Therefore, the chip-component structure 1A can be mounted in the minimum necessary mounting area.

Third Preferred Embodiment

Figure 6A:
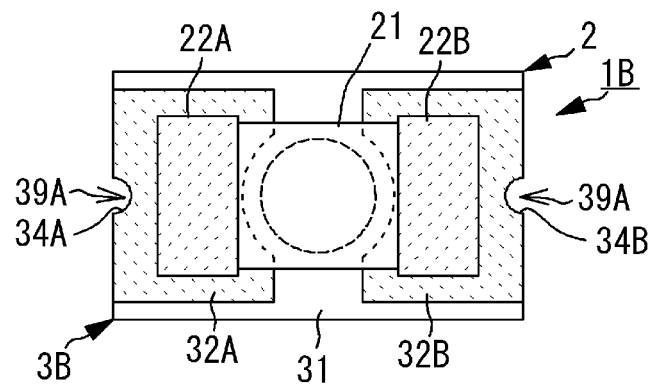
FIGS. 6A to 6C illustrate a structure of a chip-component structure according to a third preferred embodiment of the present invention.
Figure 6B:
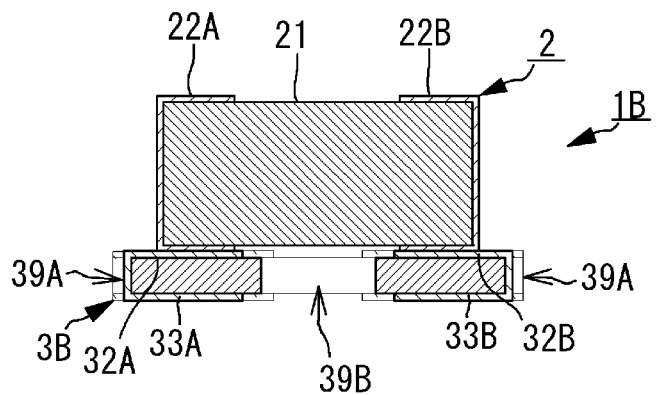
Figure 6C:
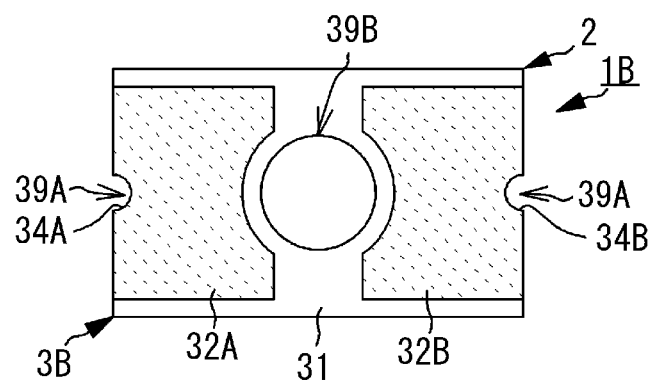
Figure 7A:
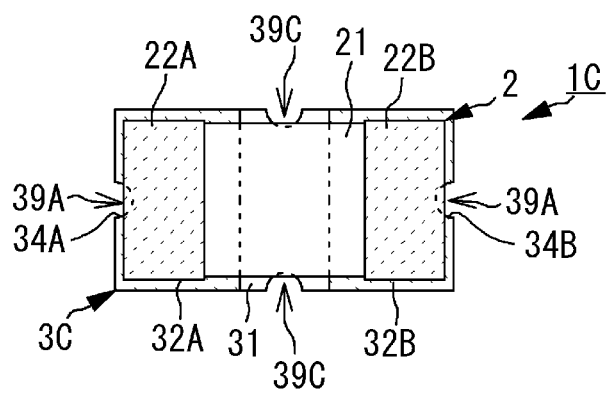
FIGS. 7A to 7D illustrate a structure of a chip-component structure according to a fourth preferred embodiment of the present invention.
Figure 7C:
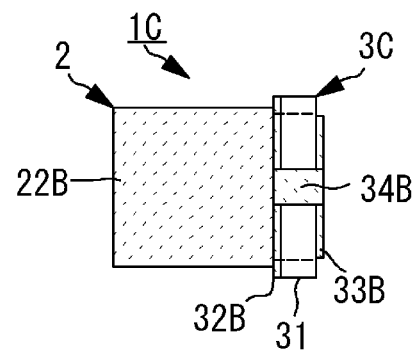
Figure 7B:
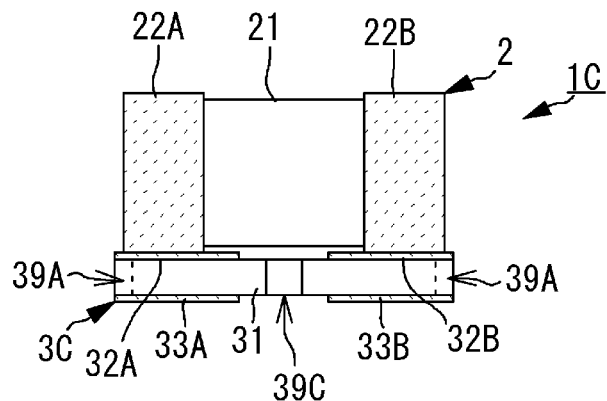
Figure 7D:
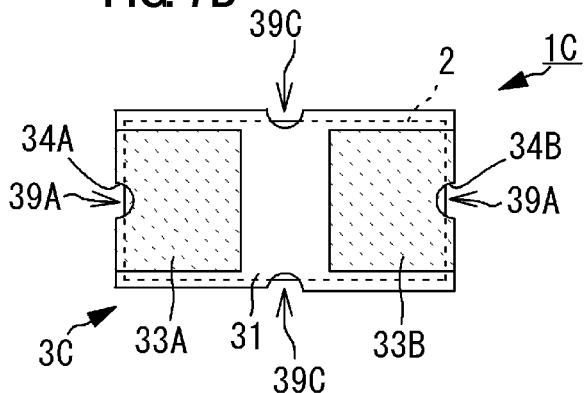

FIGS. 6A, 6B, and 6C are a plan view, a sectional front view, and a bottom view, respectively, of a chip-component structure 1B according to a third preferred embodiment.

The chip-component structure 1B of the third preferred embodiment is the same in the structure of a multilayer capacitor 2 as the chip-component structure 1 of the first preferred embodiment, but is different in that an interposer 3B having a different size is included. For this reason, in the following description, structures corresponding to the structures adopted in the first preferred embodiment are denoted by the same reference numerals.

The interposer 3B has an area wider than that of the interposer 3 of the first preferred embodiment. Grooves 39A provided in both longitudinal end surfaces of a substrate 31 do not overlap with external electrodes 22A and 22B of the multilayer capacitor 2, as viewed in a principal-surface normal direction, and arcs thereof are exposed entirely.

In this structure, a communication hole 39B is also open to spaces facing both principal surfaces of the interposer 3B, that is, to a space between the interposer 3B and the multilayer capacitor 2 and a space between the interposer 3B and a circuit board, and allows air flow between the spaces. Hence, cleaning liquid and air easily come out through the communication hole 39B, and a portion between the interposer 3B and the circuit board can be cleaned effectively.

Since substrate end surfaces of the interposer 3B are spaced far apart from component end surfaces of the multilayer capacitor 2, solder is restricted from reaching and spreading to the external electrodes 22A and 22B. This reduces vibration noise.

The shape of external connection electrodes 33A and 33B in this structure may be appropriately set according to the shape of mounting lands on the circuit board. Further, the grooves 39A may be omitted. In this case, side electrodes 34A and 34B are appropriately formed on the substrate end surfaces.

Fourth Preferred Embodiment

FIGS. 7A, 7B, 7C, and 7D are a plan view, a front view, a right side view, and a bottom view, respectively, of a chip-component structure 1C according to a fourth preferred embodiment.

The chip-component structure 1C of the fourth preferred embodiment is the same in the structure of a multilayer capacitor 2 as the chip-component structure 1 of the first preferred embodiment, but is different in that an interposer 3C includes communication grooves instead of the communication hole. For this reason, in the following description, structures corresponding to the structures adopted in the first preferred embodiment are denoted by the same reference numerals.

A substrate 31 of the interposer 3C includes communication grooves 39C provided in the centers of a front surface and a back surface. Both ends of each of the communication grooves 39C reach both principal surfaces of the interposer 3C. The depth of the communication grooves 39C is set so that the communication grooves 39C overlap with the bottom of the multilayer capacitor 2. In this structure, the communication grooves 39C are also open to spaces facing both principal surfaces of the interposer 3C, that is, to a space between the interposer 3C and the multilayer capacitor 2 and a space between the interposer 3C and a circuit board, and allow air flow between the spaces. Hence, cleaning liquid and air easily come out through the communication grooves 39C, and a portion between the interposer 3C and the circuit board can be cleaned effectively. For increasing the cleaning effect, a portion of the communication grooves 39C is preferably provided in a region facing the multilayer capacitor 2 in the interposer 3C.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A chip-component structure comprising:
a multilayer capacitor including a laminated body including a plurality of dielectric layers and a plurality of internal electrodes stacked on each other, and a pair of external electrodes provided on a side surface of the laminated body and electrically connected to the internal electrodes; and
an interposer including a substantially flat plate-shaped substrate, a pair of component connecting electrodes provided on a component mounting surface defining one principal surface of the substrate and joined to a respective one of the pair of external electrodes, a pair of external connection electrodes provided on a mount surface defining the other principal surface of the substrate, and a side electrode provided on a side surface of the substrate intersecting the component mounting surface and the mount surface to electrically connect a respective one of the pair of component connecting electrodes and a respective one of the pair of external connection electrodes; wherein the substrate includes a communicating portion that communicates between a space on the mount surface and a space between the component mounting surface and the multilayer capacitor;

the communicating portion is defined by at least one open hole having a circular or substantially circular shape;

all portions of the laminated body of the multilayer capacitor are disposed outside of the communicating portion; and the communicating portion is located between the pair of external electrodes when the multilayer capacitor and the interposer are viewed in a direction perpendicular to the principal surfaces of the substrate.

2. The chip-component structure according to claim 1, wherein the at least one open hole defining the communicating portion includes a hole that is open at an approximate center of an area of the substrate facing the multilayer capacitor.

3. The chip-component structure according to claim 1, wherein the communicating portion includes a groove provided on the side surface of the substrate and having a depth that reaches an area facing the multilayer capacitor.

4. The chip-component structure according to claim 1, wherein the side electrode is provided at a position overlapping with the multilayer capacitor when the interposer is viewed in a principal-surface normal direction.

5. The chip-component structure according to claim 1, wherein the side surface of the interposer on which the side electrode is provided is located on an outer side of the side surface of the laminated body that is parallel or substantially parallel to the side surface of the interposer.

6. The chip-component structure according to claim 1, wherein a minimum distance between the pair of component connecting electrodes is smaller than a minimum distance between the pair of external electrodes.

7. The chip-component structure according to claim 6, wherein the minimum distance between the pair of component connecting electrodes is smaller than a maximum dimension of the communicating portion in a direction connecting the pair of component connecting electrodes.

8. The chip-component structure according to claim 7, wherein in a direction perpendicular or substantially perpendicular to the direction connecting the pair of component connecting electrodes, a maximum dimension of each of the pair of component connecting electrodes is greater than a maximum dimension of the communicating portion.

9. The chip-component structure according to claim 8, wherein the direction connecting the pair of component connecting electrodes is a longitudinal direction of the substrate; and the direction connecting the pair of component connecting electrodes is a longitudinal direction of the multilayer capacitor.

10. The chip-component structure according to claim 9, wherein a diameter of the communication portion is equal to or greater than about one half of the dimension in the direction perpendicular or substantially perpendicular to the direction connecting the pair of component connecting electrodes.

11. The chip-component structure according to claim 10, wherein the direction connecting the pair of the component connecting electrodes does not intersect with a direction of a direction connecting the pair of external connection electrodes.

12. The chip-component structure according to claim 1, wherein a minimum distance between the pair of component connecting electrodes is smaller than a maximum dimension of the communicating portion in a direction connecting the pair of component connecting electrodes.

13. The chip-component structure according to claim 1, wherein in a direction perpendicular or substantially perpendicular to a direction connecting the pair of component connecting electrodes, a maximum dimension of each of the pair of component connecting electrodes is greater than a maximum dimension of the communicating portion.

14. The chip-component structure according to claim 1, wherein a direction connecting the pair of component connecting electrodes is a longitudinal direction of the substrate; and a direction connecting the pair of component connecting electrodes is a longitudinal direction of the multilayer capacitor.

15. The chip-component structure according to claim 1, wherein a diameter of the communication portion is equal to or greater than about one half of the dimension in a direction perpendicular or substantially perpendicular to a direction connecting the pair of component connecting electrodes.

16. The chip-component structure according to claim 10, wherein the direction connecting the pair of the component connecting electrodes does not intersect with a direction connecting the pair of external connection electrodes.

* * * * *